March 12, 1935.　　　F. C. LINN　　　1,994,316
SCRAPING FIXTURE
Filed Sept. 9, 1933
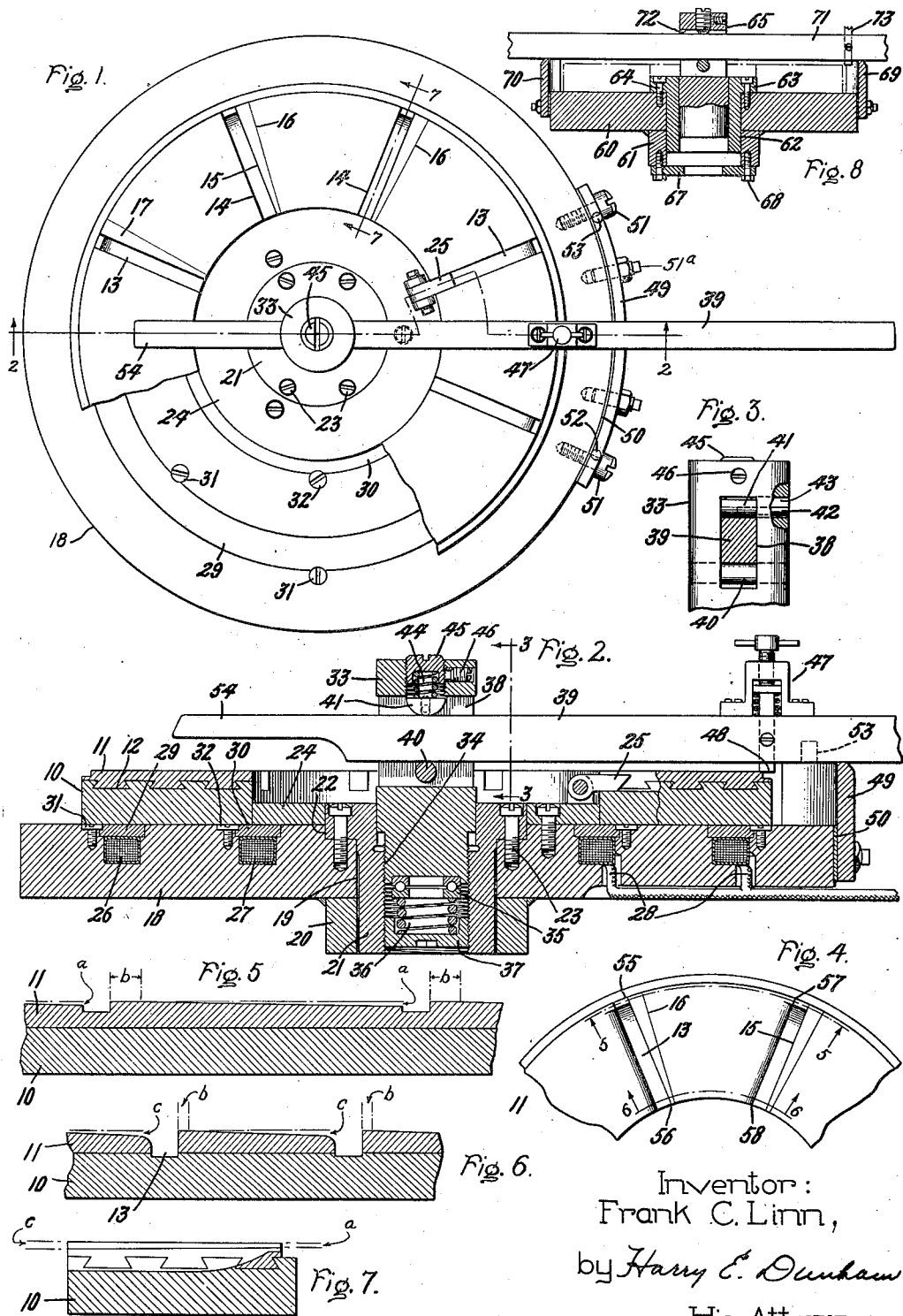
Inventor:
Frank C. Linn,
by Harry E. Dunham
His Attorney.

Patented Mar. 12, 1935

1,994,316

UNITED STATES PATENT OFFICE 1,994,316

SCRAPING FIXTURE

Frank C. Linn, Swampscott, Mass., assignor to General Electric Company, a corporation of New York Application September 9, 1933, Serial No. 688,789

5 Claims. (Cl. 90—24.3)

The present invention relates to scraping fixtures, such as are used for scraping the surfaces of thrust bearings to provide tapered lands, and has for its object the provision of an improved construction and arrangement of a scraping fixture whereby thrust bearings and other machine elements may be efficiently and accurately scraped.

For a consideration of what I believe to be novel and my invention, attention is directed to the following description and the claims appended thereto in connection with the accompanying drawing which forms a part of my specification.

In the drawing, Fig. 1 represents a top view of a scraping fixture embodying my invention with a thrust bearing, partly broken away, fastened thereto; Fig. 2 is a sectional view along lines 2—2 of Fig. 1; Fig. 3 is a view, partly broken away, along line 3—3 of Fig. 2; Fig. 4 is another top view of a portion of the thrust bearing shown in Fig. 1; Fig. 5 is an enlarged sectional view along line 5—5 of Fig. 4; Fig. 6 is another enlarged sectional view along line 6—6 of Fig. 4; Fig. 7 is a sectional view along line 7—7 of Fig. 1; and Fig. 8 represents a modification of a fixture according to my invention.

As my improved fixture is particularly adapted for scraping the lands on thrust bearings, attention is directed to a few important features of modern thrust bearings. The usual thrust bearing construction comprises a backing 10 (Fig. 2) and a lining 11 made of Babbitt-metal and held in grooves 12 in the backing, which grooves may be annular and dovetail shaped, as shown. The thrust plate may be made of a single ring, as shown, or split into two halves (not shown) to facilitate the assembly of a shaft with the bearing. During manufacture the bearing metal is poured on the backing to form a layer having a thickness before finishing of about twice the finished thickness. This is to allow impurities in the metal to rise to the surface and be machined off. After planing the bearing surface, a plurality of radial grooves 13 are cut into the bearing surface for conducting lubricant to the lands defined between adjacent grooves. The lubricant is conveyed from the radial grooves to the land by the action of a rotating body or runner, not shown. The runner is separated from the bearing surface by the resultant oil film. In order to cause the necessary amount of lubricant to flow onto the bearing surface for maximum load carrying capacity and minimum power loss, it is necessary to properly round the leading edge 14 of each land and to taper the lands, the depression being a maximum at the leading edge and progressing uniformly to zero at the trailing edge of each land. It has been found that best results as regards lubrication, power loss, and load carrying capacity are obtained if the slope near the the inner diameter of the bearing is greater than the slope near the outer diameter of the bearing. This has been indicated in Figs. 5 and 6 which show that the depression $a$ (Fig. 5) at the outer bearing diameter is less than the depression $c$ at the inner bearing diameter, thus producing a greater slope at the inner diameter than is produced at the outer diameter.

Each land has a trailing edge 15. It is another essential feature of a properly designed thrust bearing that the trailing edges of all lands be in the same plane. This is best accomplished during manufacture by tapering each land not from the trailing edge 15 towards the leading edge 14, but from a radial line 16 near the trailing edge to the leading edge 14, thus leaving a narrow non-tapered sector 17 adjacent the trailing edge 15 for each land. If then slight inaccuracies occur, they merely effect slight differences in the circumferential width of the non-tapered portions 17, which differences have no appreciable effect on the operation of the bearing. The widths $b$ of the non-tapered sections near the outer diameter and the inner diameter are indicated in Figs. 5 and 6 respectively.

The accurate manufacture of this type of thrust bearings is accomplished with my scraping fixture which will be described presently. The fixture (Figs. 1 and 2) comprises a base including an annular plate 18 having a central bore 19 and a hub 20 welded to the plate for holding the fixture in a vise or the like. A threaded flanged sleeve 21 is inserted in the bore 19, seated in a recess 22 of plate 18, and fastened thereto by means of bolts 23. A ring 24 is provided engaging the flanged portion of the sleeve 21 and the inner surface of the bearing for centering the latter. A latch 25 is held on the ring 24 and during operation is located in a radial groove of the bearing surface to obtain the same relative location of each land during the scraping operation. The bearing is held on the plate 18 by electromagnetism produced by coils 26 and 27 to which electric energy may be supplied through terminal leads 28. The coils are located in annular grooves in the upper surface of the plate 18, which grooves are closed by rings 29 and 30. The rings 29 and 30 are made of non-magnetic material and secured to the plate by screws 31 and 32. It will be readily understood that the coils when energized produce a flux having a path closed by the backing material of the bearing, the bearing thereby being held on the base of the fixture. A tool post 33 having a lower threaded portion 34 is screwed into the threaded portion of the sleeve 21, possible backlash of the thread being eliminated by the provision of a ball-bearing 35 engaging the lower end of the post and held there by a spring 36 having its lower end bearing against a nut 37 screwed into the lower end of sleeve 21. The upper part of the tool post has a transverse slot 38 for accommodating a cross bar 39. The cross bar 39 rides on a pin 40 in the slot and is held against the pin by means including a knob 41 having a pin 42, which pin rides in a slot 43 in the wall of the post. The half-spherical knob is pushed against the cross bar by a spring 44 between the knob and a nut 45 screwed into a threaded axial hole in the end of the post and secured by a locknut 46 coaxial with nut 45. A tool 47 is fastened to the cross bar, the scraping edge of the tool being indicated at 48. The right-hand end of the cross bar rides on a cam 49 which is fastened to the base by means including a shim 50, bolts 51, and dowels 51ᵃ. Stops 52 and 53 are provided on the cam surface to limit the angular movement of the cross bar. The left-hand end 54 of the cross bar is reduced in section to permit handling by an operator. During operation of the device the cross bar is held at both ends, turned back and forth, and on successive angular movements the cross bar is moved towards the left until an entire land has been scraped. The latch 25 is then removed, the coils 27 and 28 de-energized, and the bearing turned until the latch 25 may be inserted in the succeeding radial groove 13.

It will be readily seen that with the tool 47 in the position shown, the tool edge 48 scrapes off material to provide an outer slope as indicated in Fig. 5. As the tool with the cross bar is moved towards the left, the tool post, which in substance is nothing but a second cam owing to its riding support in the threaded sleeve 21, becomes more and more effective so that the circumferential slope increases towards the center of the bearing until it attains the maximum slope at the inner diameter, as indicated in Fig. 6.

Again considering one of the lands in Fig. 4, this land has four corners 55, 56, 57 and 58. The corners 55 and 56 defining the trailing edge are in the same plane whereas corner 57 is in a plane below the level of the first plane and corner 58 is in a third plane below that of corner 57. Both corners 57 and 58 define the leading edge which is slanted in a radially inward direction. Any desirable tapering of the land can be obtained by properly choosing the cam surface of cam 49 and the pitch of the threaded tool post 33.

Instead of providing a tool post riding on a thread to define a second cam, I may provide a simple tool post as a pivot for the cross bar and a second cam fastened to the base plate. Such an arrangement has been diagrammatically illustrated in Fig. 8. This arrangement comprises a base 60 having a projection or hub 61 and a central bore 62. A flanged sleeve 63 is fastened to the base plate by screws 64, and rotatably arranged in the sleeve is a tool post 65 which is prevented from falling through the bore by a stop plate 67 fastened to the projection 61 by screws 68. Fastened to diametrically opposed portions of the base plate are two cams 69 and 70 respectively. A cross bar 71 projecting through a slot 72 in the tool post and including a working tool 73 rides with its ends on the cam surfaces of cams 69 and 70 respectively. The operation is similar to that of the arrangement in Figs. 1 and 2. The cross bar, guided by the cam, is held at both ends, turned back and forth about the tool post as a center, and on successive angular movement is moved inwardly until the land to be scraped is finished.

With my invention I have accomplished a simple and efficient scraping fixture for accurately scraping the lands of thrust bearings and the like.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a fixture for scraping tapered lands on an annular thrust bearing and the like having a taper increasing in both circumferential and radial directions, a base, means for positioning and holding a bearing on the base, a cam fastened to the base, a central tool post held on the base and including means for effecting lowering and raising of the post during operation, a rotatable cross bar with a tool guided by the cam and the tool post, and stops on the cam for limiting the angular movement of the cross bar during the scraping of a land.

2. In a fixture for scraping tapered lands on an annular thrust bearing having a taper increasing in both circumferential and radial directions, a base, means for positioning and holding a bearing on the base, a cam fastened to the base, a central tool post held on the base, the post being screw threaded with a determined pitch into the base to define another cam, and a rotatable cross bar with a tool guided by the cam and the tool post.

3. In a fixture for scraping tapered lands on an annular thrust bearing and the like having a taper increasing in both circumferential and radial directions, a base, means for positioning and holding a bearing on the base, said means including a latch fastened to the base for projecting into a radial groove intermediate two tapered lands of a bearing to be scraped, two cams fastened to the base on opposite sides, a central post rotatable in a bore of the base, and a rotatable cross bar with a tool projecting through the post and engaging the cams.

4. In a scraping fixture for thrust bearings and the like, a base having a central threaded bore, means for holding and centering a bearing on the base including electromagnets having coils disposed in circular grooves in the base, a tool post having a lower threaded portion engaging the threaded bore and an upper portion with a transverse slot, a cam fastened to an outer portion of the base, a cross bar projecting into the slot and riding on the cam, and a tool supported by the bar, said threaded portion effecting lowering and raising of the post during operation.

5. In a scraping fixture for thrust bearings and the like, a base having a central threaded bore, means including an electromagnet for holding and centering a bearing on the base, a tool post having a lower threaded portion engaging the threaded bore and an upper portion with a transverse slot, a ball-bearing, spring means biasing the bearing towards the lower end of the tool post to eliminate backlash of the thread, a cam fastened to an outer portion of the base, a cross bar projecting into the slot and engaging the cam, and a tool supported by the cross bar.

FRANK C. LINN.